Oct. 31, 1950     E. B. JANVRIN     2,528,368

HUMIDITY CONTROL

Filed March 1, 1946

INVENTOR.
Everett B. Janvrin
BY
E. C. Sanborn
Attorney

Patented Oct. 31, 1950

2,528,368

UNITED STATES PATENT OFFICE 2,528,368

HUMIDITY CONTROL

Everett B. Janvrin, Cincinnati, Ohio, assignor to The Bristol Company, Waterbury, Conn., a corporation of Connecticut Application March 1, 1946, Serial No. 651,128

4 Claims. (Cl. 236—44)

This invention relates to humidity controlling devices, and more especially to a method and means for regulating the moisture content of a stream of air or other gaseous medium in an enclosed conduit. In many industrial processes, it is desired that a flowing gas be maintained at a predetermined value of relative humidity, even though its temperature vary through a considerable range, and that such regulation be effected quickly and positively. Furthermore, it may be desired to maintain a certain value of relative humidity at one time, and an entirely different value at another time, and to change from one value to another with a minimum of delay.

It is an object of the present invention to provide means whereby temperature readings simultaneously performed by dry- and wet-bulb thermometer elements exposed to an atmosphere whose moisture content is to be regulated may be caused to exercise their joint influence in maintaining said moisture content at a desired predetermined value.

It is a further object to provide means of the above nature in which a change from one humidity value to another may be effected with a minimum of delay, and substantially without interruption of the regulating function.

In carrying out the purposes of the invention, it is proposed to provide within a conduit or enclosed space, containing the gaseous medium whose moisture content is to be controlled, a spray or equivalent for admitting to said medium a humidity-affecting agent, such as steam or water, and to regulate the rate of admission of said agent by means subject to the joint influence of a wet-bulb and a dry-bulb thermometer exposed to said medium. It is proposed that said regulating means shall be embodied in an automatic controlled adapted to regulate the rate of admission of said agent on the basis of temperature measured by one of said bulbs, and to have the control point of said controller modified under the influence of the other of said bulbs. It is further proposed that the means whereby the influence of said other bulb is superposed on said control point shall include a cam having a profile conformed in accordance with a predetermined law, whereby through replacement of a cam having one form by a cam having another form the relative humidity value to which said atmosphere is regulated may be changed at will.

Figure 1:
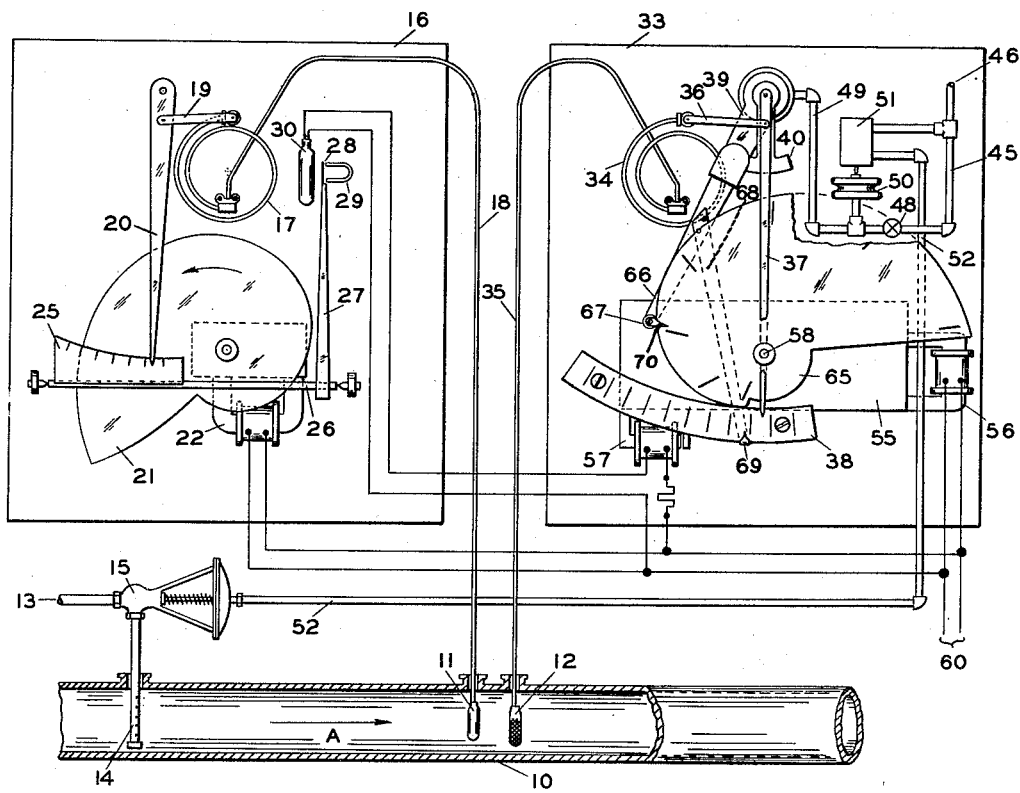
Fig. 1 is a diagrammatic representation of an installation wherein the principle of the invention is applied to the automatic regulation of humidity of a stream of gaseous medium flowing in an enclosed conduit.

Referring now to the drawings:

The numeral 10 designates a conduit or pipeline through which is caused to pass a continuous stream of air or other gaseous medium, in a direction as indicated by the arrow A. It is desired to regulate the humidity of said stream, as determined by the relative readings of a dry bulb 11 and a wet bulb 12, containing expansible or volatile fluids, and adjacently positioned within said conduit in the path of the flowing stream, and said regulation being effected by governing the rate of admission of water, steam, or other moisture-affecting agent from a source 13 through a spray-pipe 14 suitably inserted in said conduit in an upstream direction from said bulbs and including a pneumatically actuated control valve 15 of the "reverse-acting" class, viz. of that class wherein the valve is opened by an increase in pressure applied to the motor element and closed by a decrease of said pressure.

A measuring instrument 16, preferably in the form of a telemeter transmitter, includes a fluid-pressure-sensitive Bourdon spring or the equivalent 17, operatively connected to the dry bulb 11 by means of a capillary tube 18, whereby the deformation of said spring will become a measure of the temperature of the fluid within said bulb. Connected to the Bourdon spring 17, as by link 19, is an extended index or pointer-arm 20, pivotally mounted at one extremity, and deflectable at the other, to provide by its deflection a measure of the deformation of the Bourdon spring 17, and thereby of the temperature of the bulb 11. The transmitting element of the instrument 16 may preferably be of the "impulse-duration" class, wherein are developed cyclical electrical impulses having durations varying with the measured magnitude. Such an element is fully set forth and described in U. S. Letters Patent No. 2,214,159, granted to F. B. Bristol September 10, 1940. In brief, a scroll-plate 21 having a substantially radial leading edge and a spirally conformed trailing edge is caused to rotate by means of a suitable motor 22 at a constant velocity beneath the pointer-arm 20, which arm carries on its free extremity a rider, not shown in the drawing, adapted to be engaged by the leading edge of the scroll-plate, and to be released by the trailing edge, whereby with each revolution of the scroll-plate 21 said extremity is deflected alternately forward and backward a short distance perpendicular to its normal plane of displacement. Engageable by the pointer arm 20, to be deflected thereby as the latter is in turn deflected by the scroll-plate, is a rocker plate 25 carried by a shaft 26 positioned transversely of the instrument 16 and pivoted at its extremities for rotation through a small angle about an axis perpendicular to, but not intersecting, the axis of rotation of the scroll-plate. The rocker plate 25 may have upon its surface graduations and indicia, with respect to which the pointer 20 will provide a measure of the temperature of the bulb 11.

Attached to the shaft 26 is an extended arm 27, carrying upon its extremity a ferromagnetic vane 28 adapted to coact with a permanent magnet 29 in controlling the operation of a magnetically operated mercury switch 30. Thus, according to principles fully set forth in said Bristol patent, the timing of operation of said switch will depend directly upon the instants of engagement and disengagement of the pointer arm 20 by the scroll-plate 21, and, because of the conformation of said scroll-plate, will become a measure of the deflected position of said pointer-arm, and therefore of the temperature to which the bulb 11 is exposed.

A measuring and controlling instrument 33 includes a fluid-pressure-sensitive Bourdon spring 34 operatively connected to the wet bulb 12 by means of a capillary tube 35, whereby its deformation will become a measure of the temperature of the fluid within said bulb. Connected to the Bourdon spring 34, as by a link 36, is an extended index or pointer-arm 37, pivotally mounted at one extremity, and deflectable at the other, to provide by its deflection a measure of the deformation of the Bourdon spring 34, and thereby of the temperature of the wet bulb 12. If desired, there may be included in the structure a stationary scale 38 having thereon graduations and indicia, with respect to which the pointer 37 will provide a measure of the temperature of the bulb 12.

Mounted for angular adjustment about the same axis as that of the pointer-arm 37 is a pneumatic control member 39, having therein one or more jets or orifices, not shown in the drawings, whereby to form an element in a control couple, preferably of the type fully set forth and described in U. S. Letters Patent No. 1,880,247, granted to H. L. Griggs and A. R. Mabey October 4, 1932. Attached to the pointer arm 37, and deflectable therewith, is a vane member 40 adapted to coact with the member 39 variably affecting the equivalent area of the orifices therein according to the relative position of said control and vane members. The control instrumentalities associated with the members 39 and 40 are purely conventional, and being fully described both with respect to structure and function, in said Griggs et al. patent, need not here be treated in detail. A conduit 45 receives a suitable pressure fluid, e. g., compressed air, from a source 46, applying the same through a constriction 48 to a conduit 49, and thence to the control member 39 to be exhausted through the jets thereof. A pressure-sensitive bellows member 50 is directly connected to the conduit 49, and is adapted to vary its longitudinal dimension with changes of fluid pressure therein. A three-way valve member 51 mounted in juxtaposition to the bellows 50 and adapted for operation thereby, is provided with connection to the conduit 45, and is connected by means of a conduit 52 to the motor element of the valve 15. Interaction between the bellows 50 and the interior parts of the valve member 51 is such that when said bellows is collapsed the conduit 45 is in communication with the conduit 52, whereby compressed air from the source 46 is applied to the motor element of the valve 15, causing the same to be opened, and as said bellows becomes progressively expanded by increase of pressure therein, communication is correspondingly closed between the conduits 45 and 52, and the latter exhausted to the atmosphere. The relative positioning of the control members 39 and 40 being such that a movement toward the left (as shown in the drawing) of the vane 40 with respect to the jet member 39, corresponding to an increase in temperature at the bulb 12, causes said vane more completely to obstruct the orifices in said member and proportionately to inhibit the escape of air therethrough, it will be seen that such action will result in an increase in pressure within the conduit 49, and the bellows 50, whereby to actuate the valve 51 in a sense to lower the pressure in the conduit 52, thereby allowing the valve 15 to be closed to a corresponding degree. In short, with the structure as thus far set forth, and assuming that the control member 39 is maintained in a fixed position, an increase in temperature as measured by the wet bulb 12 will cause a corresponding decrease of admission of moisture through the valve 15 and spray pipe 14. The basic adjustment of the control apparatus is made such that, whatever the set position of the index 69 with respect to the scale 38, the tendency will be for the admission of moisture to assume a value where the temperature of the wet-bulb 12, as indicated by the pointer 37 on the same scale will be brought into agreement therewith.

Mounted in the instrument 33 is a telemeter receiving mechanism 55 of the impulse-duration-responsive class, and essentially similar to that fully set forth and described in U. S. Letters Patent No. 2,040,918, granted to C. W. Bristol May 19, 1936. Said mechanism, includes a constant-speed motor 56 actuating mechanisms not shown in the drawing, and controlled by the intermittent action of an electromagnet 57, whereby a rotatable shaft or spindle 58 is caused to seek and assume an angular position defined by the durations of successive operations of said electromagnet. The electromagnet 57 being energized from a suitable electrical source 60 (which may expediently serve also as a source of power for the motors 22 and 56) in series with the switch 30 in the instrument 16 and a suitable circuit, it will be seen that the energization and de-energization of said magnet will depend upon the action of said switch as hereinbefore set forth. This, by suitable proportioning, disposition, and adjustment, of correlated elements, the principles of a telemetering system may be incorporated in the associated instruments, and the angular position of the shaft or spindle 58 made representative of the temperature to which the dry bulb 11 is exposed.

Attached to the shaft or spindle 58 is a cam member 65 having a conformed periphery and adapted to assume an angular position corresponding to that of said shaft. Attached to the control member 39 is an extended arm 66, carrying a roller 67 and constituting a follower to engage the periphery of said cam member and be positioned thereby, so that the angular position of the control member 39 will be directly dependent upon that of said cam member. A pointer arm 68 attached to the arm 66 and forming an extension thereof is provided with an index 69 which cooperates with the scale 38 in providing an indication of the deflected position of the control member 39. The cam 65, being attached to the spindle 58, will assume an angular position representative of that of the pointer 20 in the instrument 16; and, since the control member 39 is positioned by the arm 66 engaging the periphery of said cam, it follows that the position of said control member will bear to the temperature of the dry bulb 11 a relationship determined by the conformation of the periphery of the cam, and that the rate of admission of water or other moistening agent through the spay pipe 14 to the conduit 10 will be subject to the joint influence of the temperatures of the bulbs 11 and 12.

In order for the apparatus as set forth to regulate the humidity of the stream of gaseous medium in the conduit 10 to a predetermined value, it is only necessary to conform the periphery of the cam member 65 to represent said humidity value through the whole range of operating temperatures which will be encountered. The design of such a cam will be better understood by reference to Fig. 2, wherein is shown a cam suited to use with thermometer systems calibrated to ranges between 80° F. and 140° F. The instrument 16 and associated telemetering system being designed so that the full range of the former is linearly represented by a deflection of 240 angular degrees of the shaft 58 and the cam 65, said cam may, if desired, be marked with radial graduations representative of the temperatures within that range. In Fig. 1 is shown an index 70 which may expediently be mounted on the stud of the roller 67, whereby the dry-bulb temperature may be directly read from such graduations marked on the surface of the cam. The radial range of the cam 65 is made such that the angular displacement of the follower 66 corresponding to said range will be equal to that represented by the scale 38. As thus far described, the type of cam for a particular type of installation would be standard, the dry- and wet- bulb temperature readings respectively being represented thereon by uniformly spaced polar coordinates; and such cams could be blanked out, and engraved or printed in any desired quantity.

Figure 2:
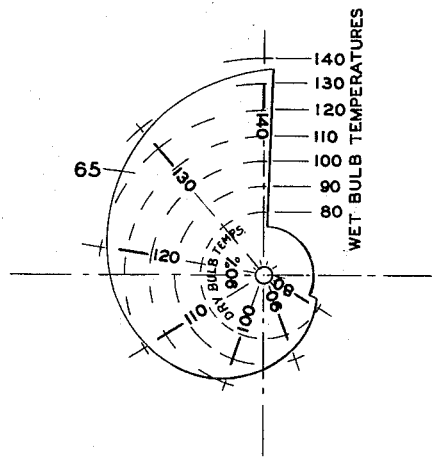
Fig. 2 is a detail of an element of the mechanism shown in Fig. 1.

A cam is conformed to control to any predetermined value of relative humidity by the simple expedient of plotting on its graduated surface a polar curve corresponding to that value of humidity which it is desired to maintain. The cam shown in Fig. 2 is shaped to such a curve, based on a polar representation of values taken from the wet-and-dry bulb tables, and corresponding to a value of 90% relative humidity, the wet-bulb temperatures being selected on the radial, and the dry-bulb temperature on the circumferential, ordinates. As the cam, deflecting with the shaft 58, will at all times assume angular positions representing the dry-bulb temperatures, the control member 39, being positioned in accord with the conformed profile of said cam, will be set to positions representing the wet-bulb temperatures corresponding to the desired humidity values at said dry-bulb temperatures, and the valve 15 adjusted accordingly in a manner to maintain between said temperatures the pre-established relationship corresponding to the preselected value of relative humidity. It will be apparent that by substitution for the cam 65 of another cam blanked to the same coordinates, and having its profile conformed to the curve corresponding to another selected humidity value, the elements of the control apparatus, without any other change, will coact to maintain in the gaseous contents of the conduit 10 a moisture content represented by said value.

While, in the embodiment hereinabove set forth, the transmitting instrument 16 and the receiving instrument 33 of a telemetering system have been shown in mutual juxtaposition, the telemetering elements serving only as a convenient linkage through which the influence of the dry-bulb temperature measuring element is superposed upon a control actuated by the wet-bulb temperature measuring element, it will be obvious that the use of the telemetering principle makes possible the effective utilization of the principle however remote from one another may the two measurements be performed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for regulating the relative humidity of a gaseous medium, comprising a dry-bulb thermometer, a wet-bulb thermometer, means comprising a pneumatic control couple for controlling the rate of admission of a humidity-affecting agent to said medium, means connected to one element of said couple for actuating the latter under control of one of said thermometers, and a single cam connected to the other element of said couple for actuating the latter under control of the other of said thermometers, said cam being displaceable in a fixed plane only and having an operating portion conformed to ordinates in said plane corresponding respectively to dry-bulb temperatures and to wet-bulb temperatures requisite for maintaining a constant relative humidity at said dry-bulb temperatures.

2. Apparatus for regulating the relative humidity of a gaseous medium, comprising a dry-bulb thermometer, a wet-bulb thermometer, means comprising a control couple for controlling the rate of admission of a humidity-affecting agent to said medium, means connected to one element of said couple for actuating the latter under control of one of said thermometers, and a single cam connected to the other element of said couple for actuating the latter under control of the other of said thermometers, said cam being displaceable in a fixed plane only and having a curved peripheral operating portion conforming to circumferential ordinates in said plane representing temperatures of one of said thermometers and radial ordinates in said plane representing temperatures of the other of said thermometers requisite for maintaining a constant relative humidity at the first mentioned temperatures.

3. Apparatus for regulating the relative humidity of a gaseous medium, comprising a dry-bulb thermometer, a wet-bulb thermometer, means comprising a control couple for controlling the rate of admission of a humidity-affecting agent to said medium, means connected to one element of said couple for actuating the latter under control of one of said thermometers, a single cam displaceable in a fixed plane only and connected to the other element of said couple for actuating the latter, and means controlled by the other of said thermometers for rotating said cam to positions corresponding to temperatures represented by said thermometer, said cam having a curved peripheral operating portion conformed to circumferential ordinates in said plane representing temperatures of said other thermometer and radial ordinates in said plane representing temperatures of the thermometer connected to the first mentioned element of the couple requisite for maintaining a constant relative humidity at the first mentioned temperatures.

4. Apparatus for regulating the relative humidity of a gaseous medium, comprising a dry-bulb thermometer, a wet-bulb thermometer, means comprising a control couple for controlling the rate of admission of a humidity-affecting agent to said medium, means connected to one element of said couple for actuating the latter under control of the wet-bulb thermometer, a single cam displaceable in a fixed plane only and connected to the other element of said couple, and means controlled by the dry-bulb thermometer for rotating said cam to positions represented by dry-bulb temperatures, said cam having a curved peripheral operating portion conformed to circumferential ordinates in said plane representing dry-bulb temperatures and radial ordinates in said plane representing wet-bulb temperatures requisite for maintaining a constant relative humidity at said dry-bulb temperatures.

EVERETT B. JANVRIN.

REFERENCES CITED

The following references are of record in the file of this patent:

UNITED STATES PATENTS

| Number | Name | Date |
|---|---|---|
| 1,284,334 | Hodge | Nov. 12, 1918 |
| 1,331,981 | Cramer et al. | Feb. 24, 1920 |
| 1,429,973 | Roesch | Sept. 26, 1922 |
| 1,453,688 | Milker | May 1, 1923 |
| 2,084,514 | Tuttle et al. | June 22, 1937 |
| 2,128,176 | Bast et al. | Aug. 23, 1938 |
| 2,231,568 | Gorrie | Feb. 11, 1941 |